United States Patent
Ida et al.

(10) Patent No.: US 7,050,070 B2
(45) Date of Patent: May 23, 2006

(54) IMAGE EDITING METHOD AND IMAGE EDITING APPARATUS

(75) Inventors: Takashi Ida, Kawasaki (JP); Osamu Hori, Yokohama (JP); Nobuyuki Matsumoto, Kawasaki (JP); Hidenori Takeshima, Ebina (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 28 days.

(21) Appl. No.: 10/610,563

(22) Filed: Jul. 2, 2003

(65) Prior Publication Data

US 2004/0004626 A1    Jan. 8, 2004

(30) Foreign Application Priority Data

Jul. 5, 2002    (JP) ............................. 2002-197228

(51) Int. Cl.
*G09G 5/00*    (2006.01)

(52) U.S. Cl. .................. 345/629; 345/620; 345/626
(58) Field of Classification Search ............... 345/620, 345/634, 716, 619, 622, 626, 629, 418–19
See application file for complete search history.

(56) References Cited

U.S. PATENT DOCUMENTS

| | | | |
|---|---|---|---|
| 6,285,381 B1 * | 9/2001 | Sawano et al. | 345/634 |
| 6,335,985 B1 | 1/2002 | Sambonsugi et al. | |
| 6,563,960 B1 * | 5/2003 | Chan et al. | 345/629 |
| 6,677,967 B1 * | 1/2004 | Sawano et al. | 715/839 |
| 2004/0100482 A1 * | 5/2004 | Cajolet et al. | 345/716 |

OTHER PUBLICATIONS

Adobe Photoshop 6.0 ( Japanese Edition ), User Guide, pp. 154-157.

* cited by examiner

*Primary Examiner*—Amr A. Awad
*Assistant Examiner*—Chante Harrison
(74) *Attorney, Agent, or Firm*—Oblon, Spivak, McClelland, Maier & Neustadt, P.C.

(57) ABSTRACT

An image editing method comprises storing original images, storing alpha masks corresponding to the original images, respectively, superposing in turn object images that are extracted from the original images by the alpha masks, to display a composite image on a first display region of a display screen, modifying selectively the alpha masks on a second display region of the display screen to modify the composite image as necessary, and displaying the composite image reflecting modification of at least one of the alpha masks on the second display region.

19 Claims, 8 Drawing Sheets

IMAGE EDITING METHOD AND IMAGE EDITING APPARATUS

CROSS-REFERENCE TO RELATED APPLICATIONS

This application is based upon and claims the benefit of priority from the prior Japanese Patent Application No. 2002-197228, filed Jul. 5, 2002, the entire contents of which are incorporated herein by reference.

BACKGROUND OF THE INVENTION

1. Field of the Invention

The present invention relates to an image editing method and an image editing apparatus which performs an image processing such as combination of images and editing.

2. Description of the Related Art

An alpha mask is often used when clipping out an object (subjects such as a person, an object appearing in a picture) from an image, and executing a process for combining a clipped object with another image with a personal computer. An alpha mask is a binary image of the same size as an original image. For example, a region having an image value of 0 is a background, and a region having a pixel value of zero is an object. Only a background is replaced with another image by substituting only a pixel having a pixel value of 0 with a pixel of another image referring to an alpha mask when synthesizing the original image with another image. In such an image synthesis, it is necessary to set an alpha mask precisely. There is Photoshop of Adobe Systems Incorporated as software for performing the image combination. There will now be described an extraction tool adopted in the Photoshop version 6 (Adobe Photoshop 6.0 Japanese edition user guide, p. 154 to 157). Original images 1, 2, 3 and 4 shown in FIG. 4 as an example are combined to generate a composite image A shown in FIG. 5. In this case, a plurality of original images are arranged in a plurality of layers, respectively. The layer is for deciding the overwrite order of the original images. The composite image is generated by overwriting in turn the upper layers on the image of the lowest layer used as furring.

In other words, the original image from which an object is to be clipped and combined is selected. The pointer of a mouse is moved on this original image to set an object region. When a preview is carried out in a setting process, a background region is displayed by a given pattern (in this case whole area is in white) like the object image 3-1 of FIG. 6. Thus, the background region and the object region can be confirmed. The alpha mask in this case is shown in the alpha mask 3-1. When the border of this object region is deviated from the contour of an actual object as with the object images 3-2 and 3-3 of FIG. 6, it is possible to modify the image with a pen tool again. When the "Enter" button is pressed, an extraction dialogue becomes extinct in a result that the background region of the original image is erased. When the lower layer image is not disposed with respect to the original image beforehand, the background is displayed with being replaced with another pattern. However, if the lower layer image is disposed, a composite image is displayed.

In an example of the above-mentioned composite image A, the left side of the original image 3 appears on the composite image, but the lower side is covered by a car in front. Therefore, the object image 3-3 must be modified with respect to its object region. However, the object image 3-2 requires no modification of the object region, because the error in the object image 3-2 does not appear on the composite image. However, in the case of the extraction tool of Photoshop (Trademark), the composite image cannot be confirmed till the extraction work is finished. For this reason, even if it is the object image 3-2, the modification work cannot be omitted. As a result, a user must carry out a useless activity. As thus described, the conventional method must set a correct object region than need, resulting in increasing a working time.

BRIEF SUMMARY OF THE INVENTION

It is an object of the present invention to provide an image editing method and an image editing system which can edit an image without setting an object region needlessly at the time of making up of an alpha mask.

According to an aspect of the present invention, there is provided an image editing method comprising: storing a plurality of original images; storing a plurality of alpha masks corresponding to the plurality of original images, respectively, superposing in turn a plurality of object images that are extracted from the plurality of original images by the plurality of alpha masks, to display a composite image on a first display region of a display screen; modifying selectively the alpha masks on a second display region of the display screen to modify the composite image; and displaying the composite image reflecting modification of at least one of the alpha masks on the second display region.

DETAILED DESCRIPTION OF THE INVENTION

Figure 1:
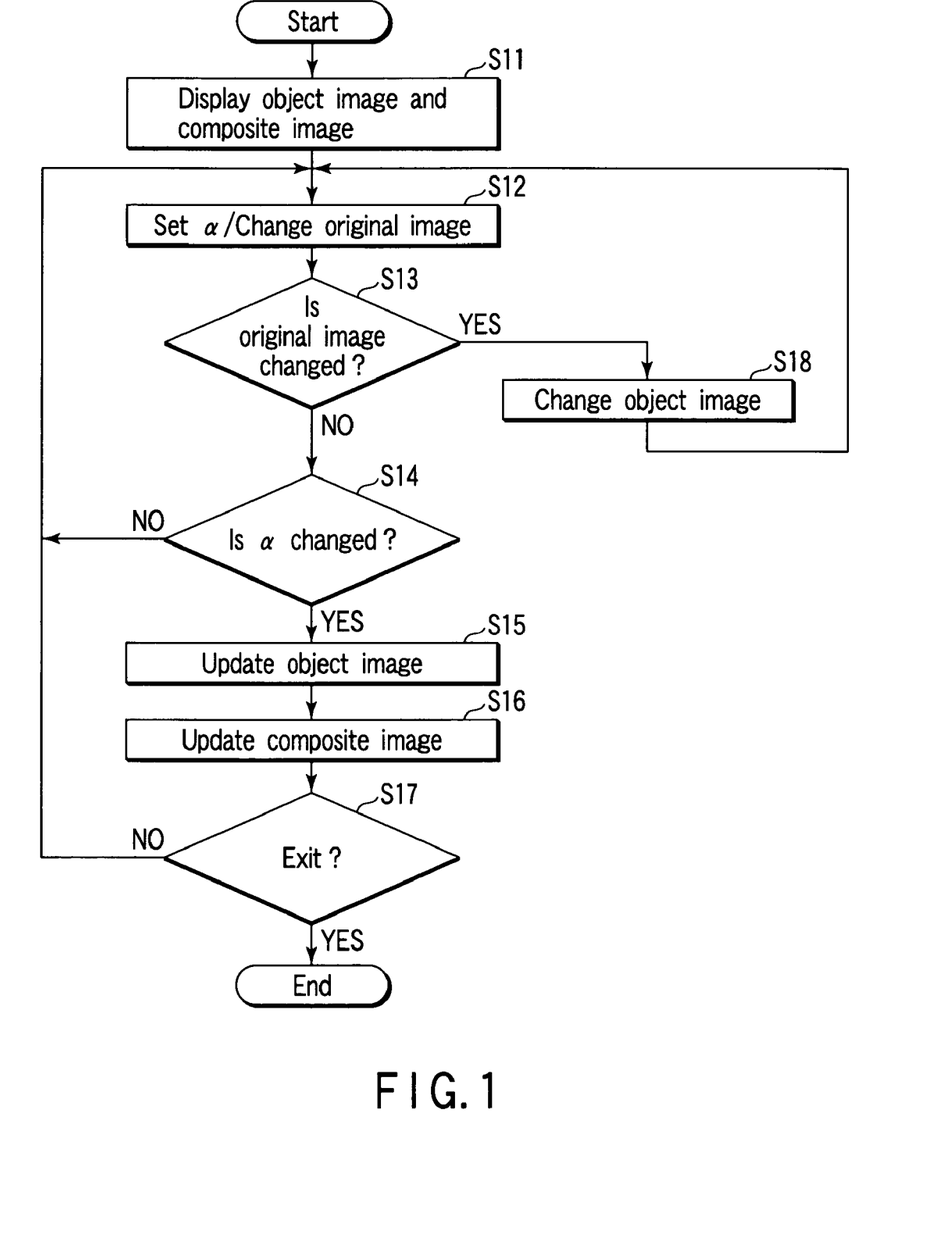
FIG. 1 shows flowchart to explain an image editing method according to an embodiment of the present invention.

There will now be described an embodiment of the present invention in conjunction with drawings. FIG. 1 shows flowchart to carry out an image editing method according to one embodiment of the present invention. Referring to this flowchart, there will now be described an embodiment to do setting of an object region and displaying of a composite image at the same time.

Figure 2:
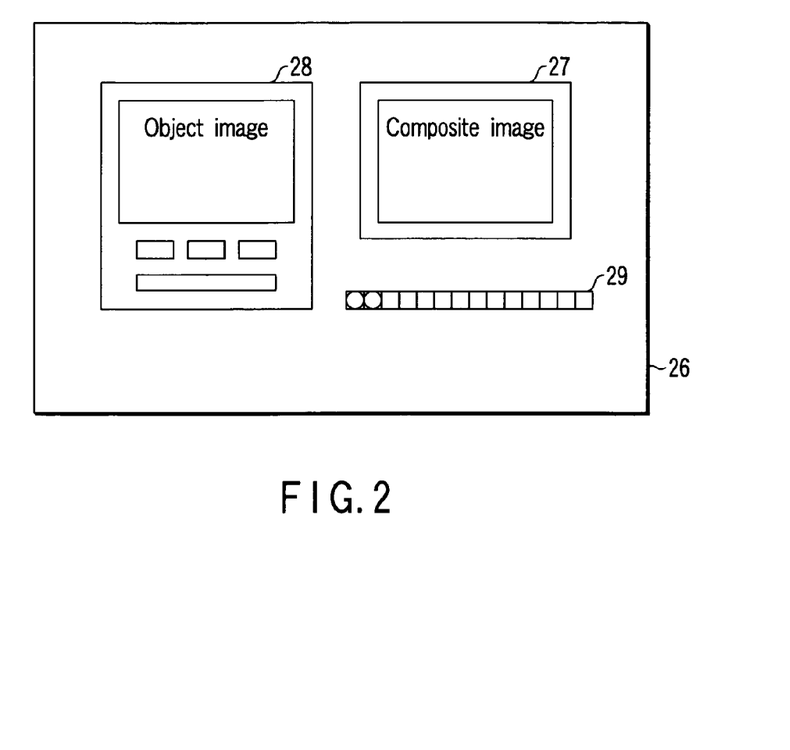
FIG. 2 shows a screen of a personal computer used for executing the image editing method according to the embodiment.

At first, an object image and a composite image are displayed (S11). Then, using a plurality of original images and alpha masks which are already stored, the display image specified by a user is displayed on a window 28 in a personal computer screen 26 as shown in FIG. 2 as an object image. A composite image is displayed on the other window 27. The alpha mask is set according to the input of a mouse pointer (S12). Then, for example, an object pen is selected from a toolbar 29 as shown in FIG. 2, and the pointer is moved in the window 28 to set an object region. A change of an original image in which an object region is to be set is requested from a user.

Whether the change of the original image is requested is determined (S13). When this determination is YES, the object image is changed and the process is returned to step S12 (S18). When the determination is NO, whether the alpha mask is changed is determined (S14). When the original image is not changed, the process is returned to step S12. When the original image is changed, the object image is updated (S15). The composite image is updated according to the changed alpha mask (S16).

Next, it is determined whether setting of the object region setting and end of the composite image display are requested by the user (S17). When the determination is NO, the process is returned to step S12. When the determination is YES, the process ends.

Figure 3:
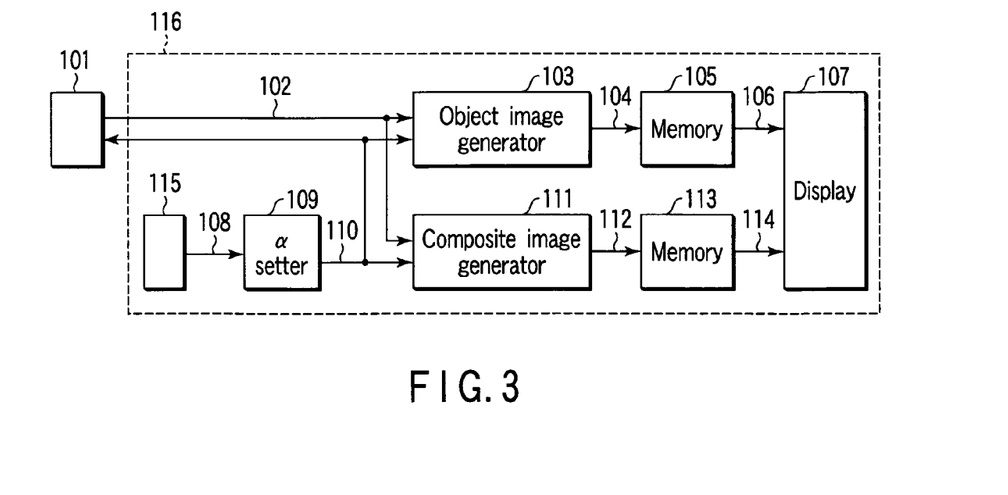
FIG. 3 shows a block diagram of an image editing apparatus to carry out the image editing method according to the embodiment.

A block circuit of an image editing system for executing the image editing method of the flow chart of FIG. 1 is shown in FIG. 3. According to this block circuit, a storage unit 101 is configured by a harddisk of a personal computer, a semiconductor memory, a magnetic storage medium. The storage unit 101 stores a file of a plurality of original images beforehand. Assuming that the original images are original images 1, 2, 3 and 4 shown in FIG. 4.

The original image data 102 read from the storage unit 101 is input to an object image generator 103. The original image data is a part of the original images stored in the storage unit 101. The object image generator 103 generates an object image expressing the setting situation of the object region of the original image. If the object image generator 103 is a personal computer, it is not exclusive hardware but may be a CPU. An alpha mask setter 109 and composite image generator 111 described latter may be constructed by a CPU.

The object images include, for example, an image whose background region is painted over with a given color, an image whose background region is replaced with a given pattern. If the background region is an image colored with semi transparency, the pattern of the background can be confirmed, and the setting situation of the alpha mask can be understood. Similarly, the object region may be an image colored with semi transparency, and the background region and object region are colored with different semitransparent.

In the initial state of the object region setting, a given alpha mask, for example, a full-scale object or a full-scale background is used. The object image data 104 is sent to a memory 105, and stored therein. Object image data 106 is sent to a display 107 at a constant time interval or a timing for refreshing a screen from the memory 105, and displayed thereon. This display 107 assumes the screen of a personal computer as shown in FIG. 2. This personal computer screen 26 displays a composite image display window 27 for displaying a composite image, an object image display window 28 on which the object region is set and a toolbar 29 used for the object region setting. Icons representing an object pen and a background pen are arranged on the toolbar 29. The object pen or background pen can be select by clicking selectively these icons. When the display image of the window 28 is modified by the object pen or background pen, this modification is reflected on the composite image displayed on the window 27 promptly. The menu used for reading and saving an image file is prepared on the window 28.

The user confirms the setting situation of the object region and modifies the image appropriately, while he or her watches the image on the screen 26. For example, the user selects an object pen from the toolbar 29, and traces a part that is an object in the original image but a background in the current alpha mask to change the part to the object region. When the part is a background in the original image, but an object in the current alpha mask, the part is modified by the background pen. As described above, operation information 108 of the user that regards to a movement of the pointer of a pointing device 115 such as a mouth is input to an alpha mask setter 109. The alpha mask 110 changed according to the operation information 108 is sent to an object image generator 103 to update the object image. The pointing device 115 may use a touch panel or a pen tablet.

Figure 4:
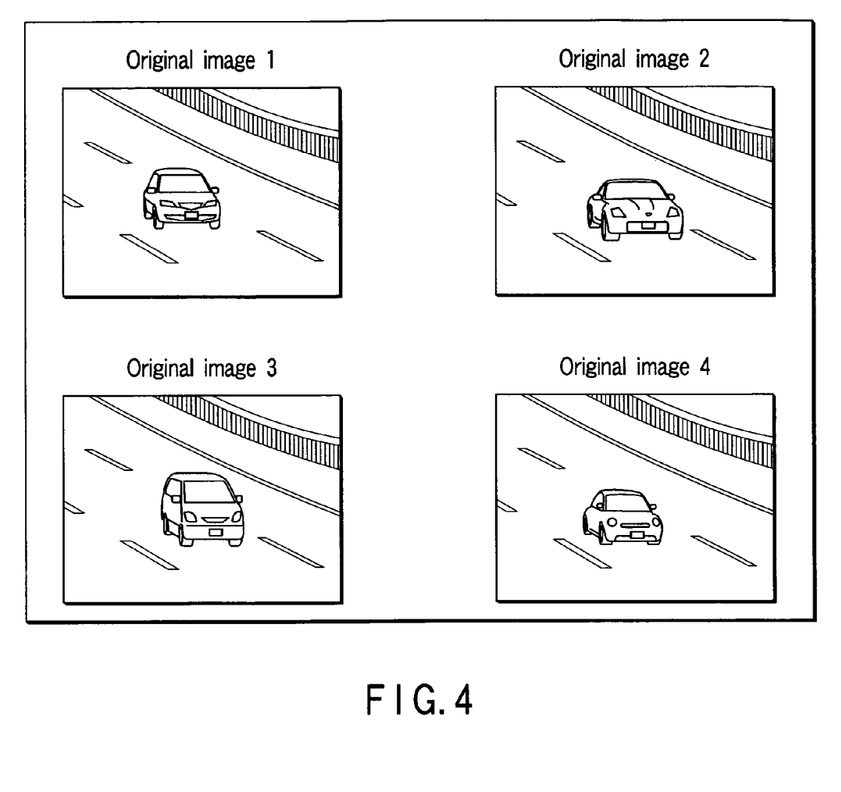
FIG. 4 shows an example of an original image.

A plurality of original image data 102 used for composition, the original image data of original images 1–4 shown in FIG. 4 are input to the composite image generator 111. Each alpha mask of the original image data 102 of the original images 1–4 is sent to the composite image generator 111 from the storage unit 101 or alpha mask setter 109. The composite image generator 111 combines a plurality of original images 1–4 in a given order referring to the alpha mask to generate a composite image A (FIG. 5).

Figure 5:
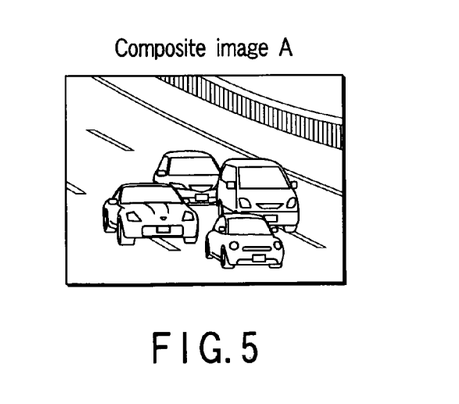
FIG. 5 shows an example of a composite image.

In the example of FIGS. 4 and 5, the original image 1 is a lower layer image. The original images 2, 3 and 4 are overwritten on the lower layer image to generate a composite image A. In other words, at first when the object image is extracted from the original image 1 by the corresponding alpha mask, the data of the object image is stored in the memory 113 and sent to the display 107 therefrom. As a result, the object image of the original image 1 is displayed on the composite image display window 27.

Figure 6:
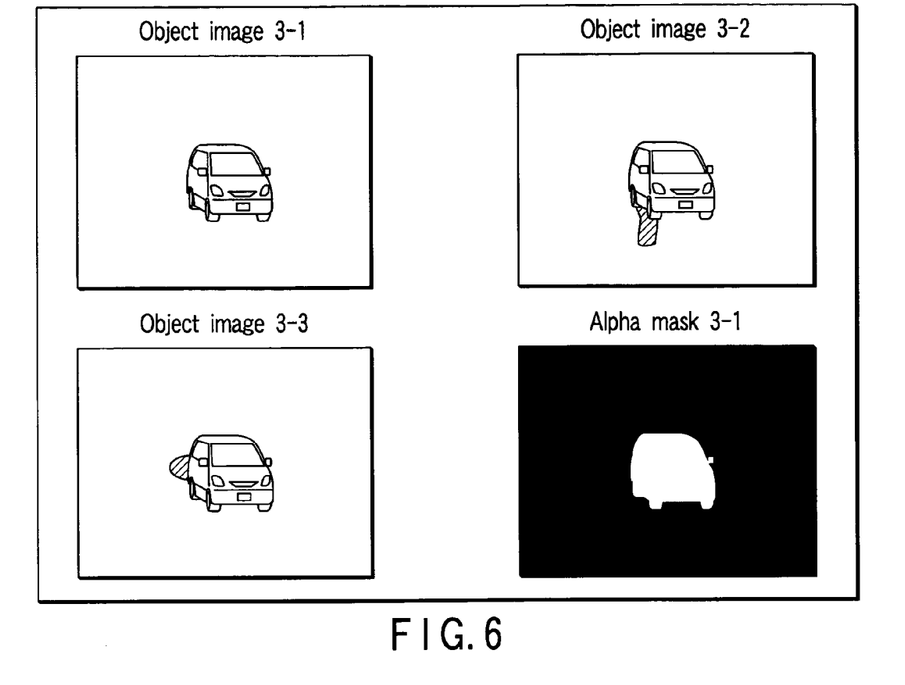
FIG. 6 shows an example of an object image and an alpha mask.

When the object image of the original image 2 is extracted using the corresponding alpha mask, the data of the object image is stored in the memory 113. The object image of the original image 2 is displayed on the window 27 with being superposed on the object image of the original image 1. In this time, when a part protruded from the object image of the original image 2, for example, a part of a road shown behind the vehicle body as shown in the object image 3-3 of FIG. 6 is displayed with being superposed on the front part of the object of the original image 1, that is, the vehicle body, the user modifies the alpha mask corresponding to the original image 2 in the window 28 displaying the original image 2 with the object pen to delete the protruded part. This deletion can be confirmed in the composite image window 27. Similarly, when the object image of the original image 3 is extracted using the corresponding alpha mask, the data of the object image is stored in the memory 113. The object image of the original image 3 is displayed on the window 27 with being superposed on the composite image of the original images 1 and 2. Then, a part protruded from the object image of the original image 3, for example, a part of a road indicated on the front wheel of the vehicle body as shown in the object image 3-3 of FIG. 6 appears on the composite image of three original images as a protruded part.

However, since this extrusion is a part of the road, even if the object image of the original image 4 is not superposed on the object image of the original image 3, the extrusion can be incorporated in the composite image without sense of incongruity. If this extrusion is not a part of the road, the object image of the original image 4 is superposed once on the object image of the original image 3 to confirm whether the extrusion is hidden by the object image of the original image 4. If the extrusion is not hidden by the object image of the original image 4, in the window 28 displaying the original image 3, the corresponding alpha mask is modified with the object pen to erase the extrusion. This erasure of the extrusion can be confirmed on the composite image window 27. The object image of the original image 4, that is, the vehicle body is extracted by the corresponding alpha mask, and superposed on the previous image while modifying the alpha mask as necessary. As a result, the composite image A shown in FIG. 5 is generated.

As discussed above, according to the present embodiment, the composite image indication window 27 and object image display window 28 are displayed on the personal computer screen. A plurality of original images allocated to hierarchy layers and alpha masks corresponding to the original images are taken in sequentially. The object region of the original image is extracted using the corresponding alpha mask on the object image display window 28. The object regions are superposed while watching the composite image window 27. The alpha mask is modified as necessary to generate a suitable composite image.

When the composite image is generated as described above, the alpha mask 110 finished by modification is sent to the storage unit 101. In FIG. 3, a portion surrounded by a dotted line is called an alpha mask generator 116.

By the above constitution, it is possible to set the object region while ensuring the composite image, a part making quality of the composite image deteriorate is modified. As described above, when the composite image A of FIG. 5 is made up, in the case of the object image 3-3 of FIG. 6, the car behind is overwritten by the extrusion on the left hand side of this car, in a result that a good composite image is not provided. For this reason, while confirming the composite image on the composite image window 27, this extrusion is deleted on the object image window 28.

On the other hand, in the object image 3-2, the extrusion does not appear on the composite image because it is overwritten by a car of the original image 4. Therefore, it is found that the object image 3-2 does not need to be modified. Because the modification of the alpha mask is reflected in the composite image promptly, it can be conveniently confirmed whether the modification is sufficient.

Updating of the composite image is repeated with a comparatively short time interval. When great throughput due to this repetitive process wants to be avoided, the composite image is updated at a timing that movement of a pen is stopped or the timing when the pen lefts a screen. Alternatively, when the alpha mask is changed, the composite image is updated. If only a part of the composite image that is changed in the alpha mask is overwritten, the throughput of the updating can be reduced.

Figure 7:
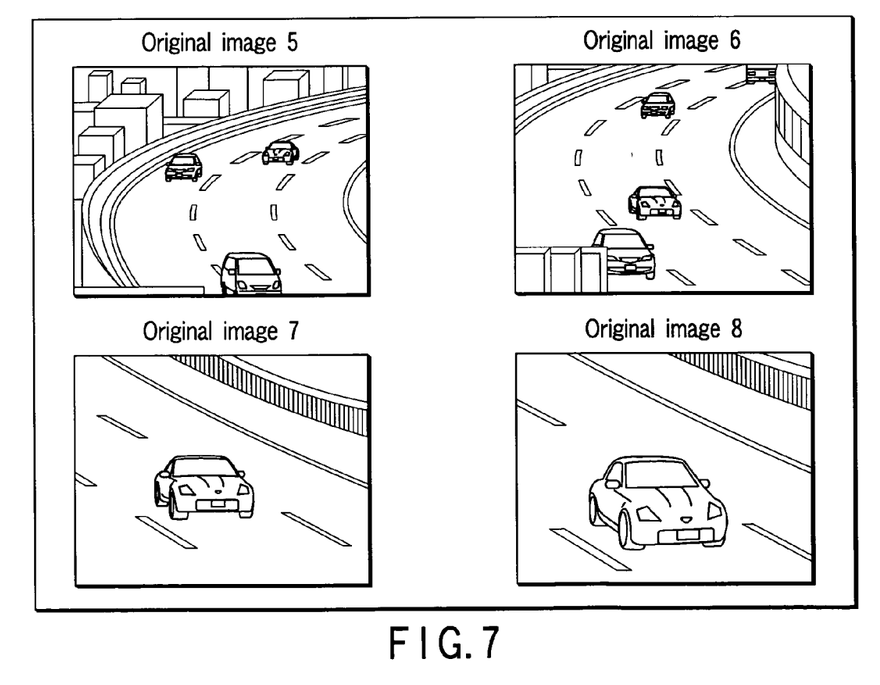
FIG. 7 shows an example of a time sequential original image.
Figure 8:
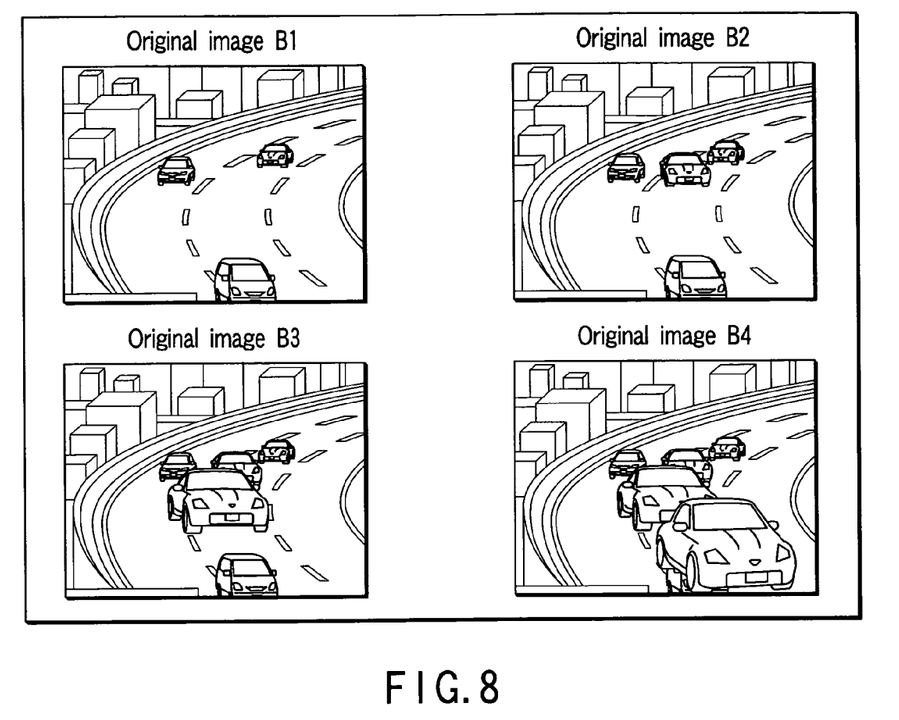
FIG. 8 shows an example of a composite image with the use of a time sequential original image.

FIGS. 7 and 8 show original images and composite images in the embodiment of the present invention that is applied to a video image. FIG. 7 shows a scene where an interest car gradually approaches from a distant place. Such a moving image and an alpha mask of each frame are stored in the storage unit 101. The image which the user wants to finally make is a composite image B4 of FIG. 8. In this example, the original image is a video image, but the composite image is a still image obtained by superposing cars of original images 6, 7 and 8 on an original image 5. Even in this case, if the alpha mask is modified while confirming the composite image, no alpha mask that is more accurate than required can be formed.

There is a case that the composite image has a plurality of frames to be displayed in a video image, and object regions corresponding to the frames are set. The composite image B1 of FIG. 8 is the same image as the original image 5 of FIG. 7, and the composite image B2 is an image obtained by combining the original image 5 with a car of the original image 6. The composite image B3 is an image obtained by combining cars of the original images 6 and 7 with the original image 5. Displaying the composite images B1, B2, B3 and B4 sequentially generates a moving image. In this case, the quality of the composite images B2 and B3 as well as the composite image B4 is important, too. Consequently, when the alpha image of the original image 7, for example, is modified, an image corresponding to the composite image B3 made up using only the original images 5, 6 and 7 is displayed. For example, even if a part of the road of the original image 7 is combined with an object region protruding, if the part is indistinctive in the composite image, it can be confirmed that the original image needs not to be modified. On the contrary, when the car behind is overwritten by the extrusion, the modification is necessary. This situation can be understood from FIG. 8.

If the composite image to be displayed when the alpha mask is modified is displayed in a form of a moving image, the throughput increases. However, the composite image can be confirmed in a last display form. For example, even if a certain frame includes an error, it can be determined that the frame need not be corrected if the error is displayed only for a moment.

If the frames of the composite image are displayed in juxtaposition on the screen, that is, four images of FIG. 8 are displayed in juxtaposition, all frames can be conveniently confirmed at a time. When many objects are combined as shown in the composite images A and B4, which object is modified cannot be determined instantly. For this reason, if, in the composite image, the modified object is colored thinly, surrounded with a dotted line, or marked with a pattern such as slanted lines, the modified object can be distinct in easy.

A user selecting an image file name can change the original image to which an object region is set in easy. Alternatively, when a point of the composite image is clicked, the original image that the point is included as an object region or the point is near the object region is automatically displayed. In this case, if a portion that the composite quality of the composite image is no good is simply clicked, an original image to be modified is conveniently displayed.

When the composite image is saved in the storage unit, there is a situation that a file size should not be made too big. To do so, it is convenient to display, on the window 27 or window 28, the file size when the composite image is stored in the storage unit. The user can provide a contrivance for reducing the number of objects and the number of frames while watching the numeric value of the file size if the file size is too big.

Figure 9:
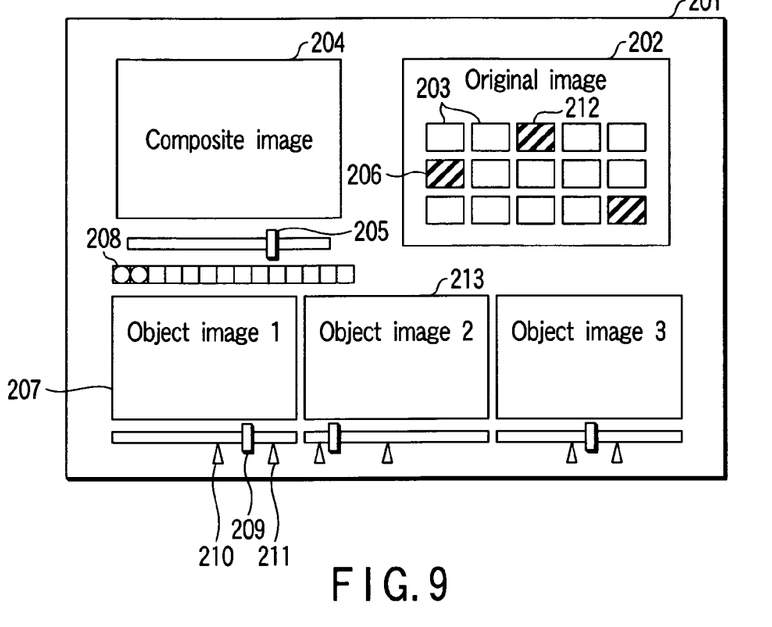
FIG. 9 shows a screen of a personal computer used for an image editing apparatus according to an embodiment of this invention.

Another example of a personal computer screen is shown in FIG. 9. Thumbnail images 203 corresponding to the original images are displayed on an original image display window 202 in a screen 201. Thanks to this, the image used for composition can be confirmed easily. The composite image is displayed on the composite image window 204. The frame of the composite image can be moved backward and forward by operation of a slide bar 205 in the case of the moving image.

The user clicks the thumbnail image 206 corresponding to the image including an object region to be modified or drags the thumbnail image 206 on the object image window 207. As a result, an object image is displayed on the object image window 207, to permit editing of the image. The image is modified using a pen tool in a toolbar 208. The thumbnail image 206 is displayed so that it is found that the image is under edition. For example, if an original image that is colored or surrounded by a thick frame is a video image, the display frame of the object image can be moved backward and forward by operation of the slide bar 209. When only some frames of the original image is to be used for combination, a start frame pointer 210 and an end pointer 211 are prepared. The pointers 210 and 211 are arranged on a start frame and an end frame of frames used for combination, respectively, to use only the frames between the start and end frames for combination. Accordingly, when the number of the composite frames is larger than that of the set frames, the original image is repeated or the last frame is stopped. Alternatively, the image is reproduced backward in time from the last frame. When the image 206 is edited simultaneously with the image 206, the thumbnail image 212 is clicked. Then, the object image window 213 is opened and editing is enabled. Similarly, this figure shows an example that editing of three images is possible at the same time.

Figure 10:
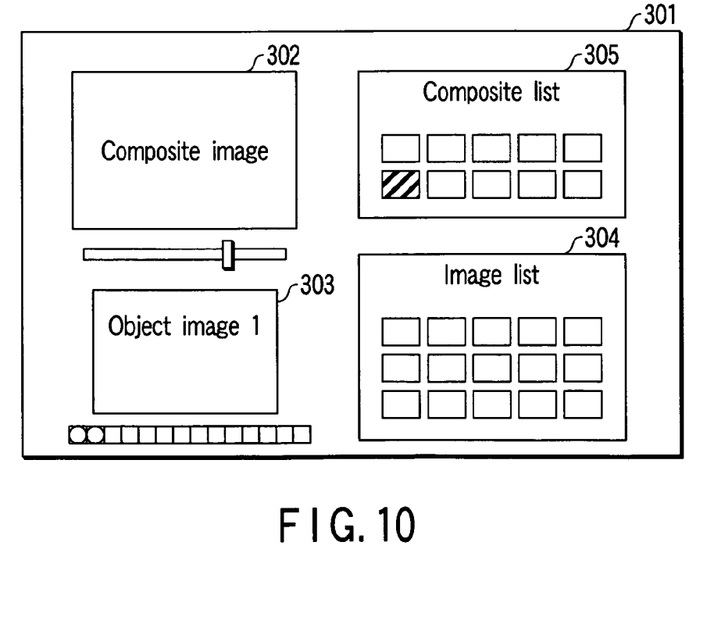
FIG. 10 shows a screen of a personal computer used for an image editing apparatus according to an embodiment of this invention.

Another embodiment of a personal computer screen is shown in FIG. 10. Since a composite image window 302 in a personal computer screen 301 and an object image window 303 are the same as that of the previous embodiment, a detailed explanation is omitted. The thumbnails of all original images stored in a hard disk are displayed on a image list window 304. When an image used actually for combination is clicked, the thumbnail image corresponding to the image moves to a composite list window 305, and simultaneously the composite image is displayed on the composite image window 302. Alternatively, the thumbnail image on the image list window 304 drags to the composite list window 305 or composite image window 302 to move the image to the composite list.

The original image used for the composite image is displayed with a thumbnail image on the composite list window 305. When any one of the thumbnail images is clicked or the thumbnail image drags to the object image window 303, this alpha mask can be edited. When the thumbnail image of the composite list window 305 is dragged to the image list window 304, the image is removed from the composite image.

An embodiment for setting an object region for original image files located at a place using a plurality of computers will be described referring to FIG. 11. According to this, the original image 403 stored in the storage unit 402 of a server 401 is input to a client 404 corresponding to another computer. In the client 404, an alpha mask 406 is generated by each of alpha mask generators 405 shown in FIG. 11, and returned to the storage unit 402 of the server 401. Similarly, alpha masks are generated with a plurality of clients. According to this embodiment, many operators are necessary, but many alpha masks are generated in a short period of time by a parallel operation.

A LAN and a public correspondence are connected between the server and each client. Each client sends the original image in editing to the server so that a plurality of editing tasks are not executed for the same original image at the same time. The server holds information of the original image in editing, and each client reads the information to prevent the original image in editing from further editing.

Figure 11:
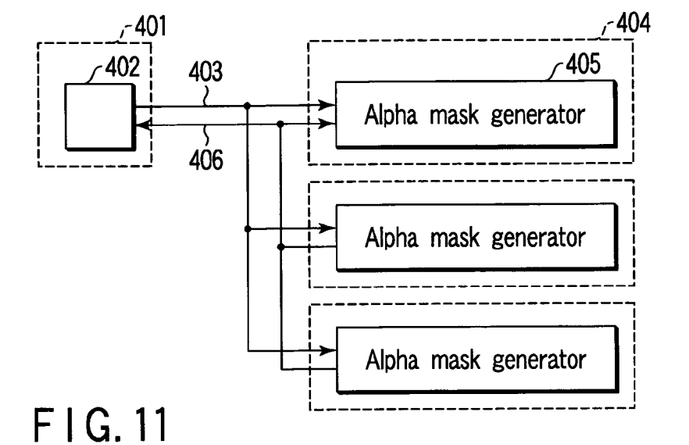
FIG. 11 shows a block diagram of an image editing apparatus according to another embodiment of the present invention.
Figure 12:
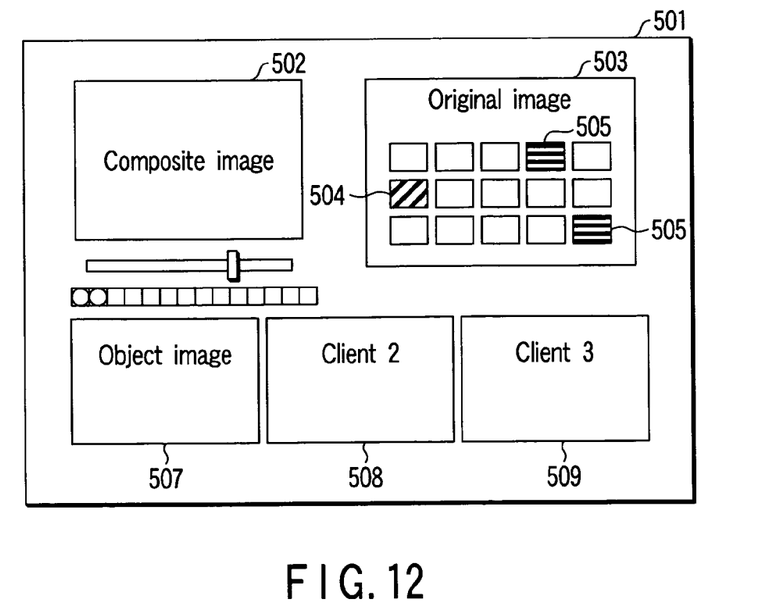
FIG. 12 shows a screen of a personal computer used for an image editing apparatus according to another embodiment of the present invention.

The screen of the client 404 shown in FIG. 11 is shown in FIG. 12. The composite image is displayed on the composite image window 502 in the screen 501. The server sends the data of the original image and alpha mask. The thumbnail images of the original image are displayed side by side on an original image display window 503. When the thumbnail image 504 of the image corresponding to an alpha mask to be edited is selected and clicked, the object image is displayed on the object image window 507 to make editing possible.

The process on the object image window 507 is similar to the above embodiment. In the present embodiment, another user edits an alpha mask in another client at the same time. In this case, a monitor window 508 is provided for confirming the work situation of another user and displays the object image in editing in another client. Also, the object image in editing in another client is displayed on a monitor window 509.

In the original image display window 503, the thumbnail image 505 in editing in another client is colored with a color different from that of the thumbnail image 504. As a result, the original images that are not edited can be discriminated easily. An original image to be edited next is selected from the non-edited original images. The alpha masks in editing are held in the clients, respectively, and transferred to the server sequentially, to monitor respective editing situations to one another. Each client reads the alpha mask to generate the object image for monitoring and updating the composite image. Then, if the transfer frequency is decreased or the transfer is performed first when the operator saves the alpha mask, the monitoring frame rate decreases, but the quantity of transfer data can be reduced.

Figure 13:
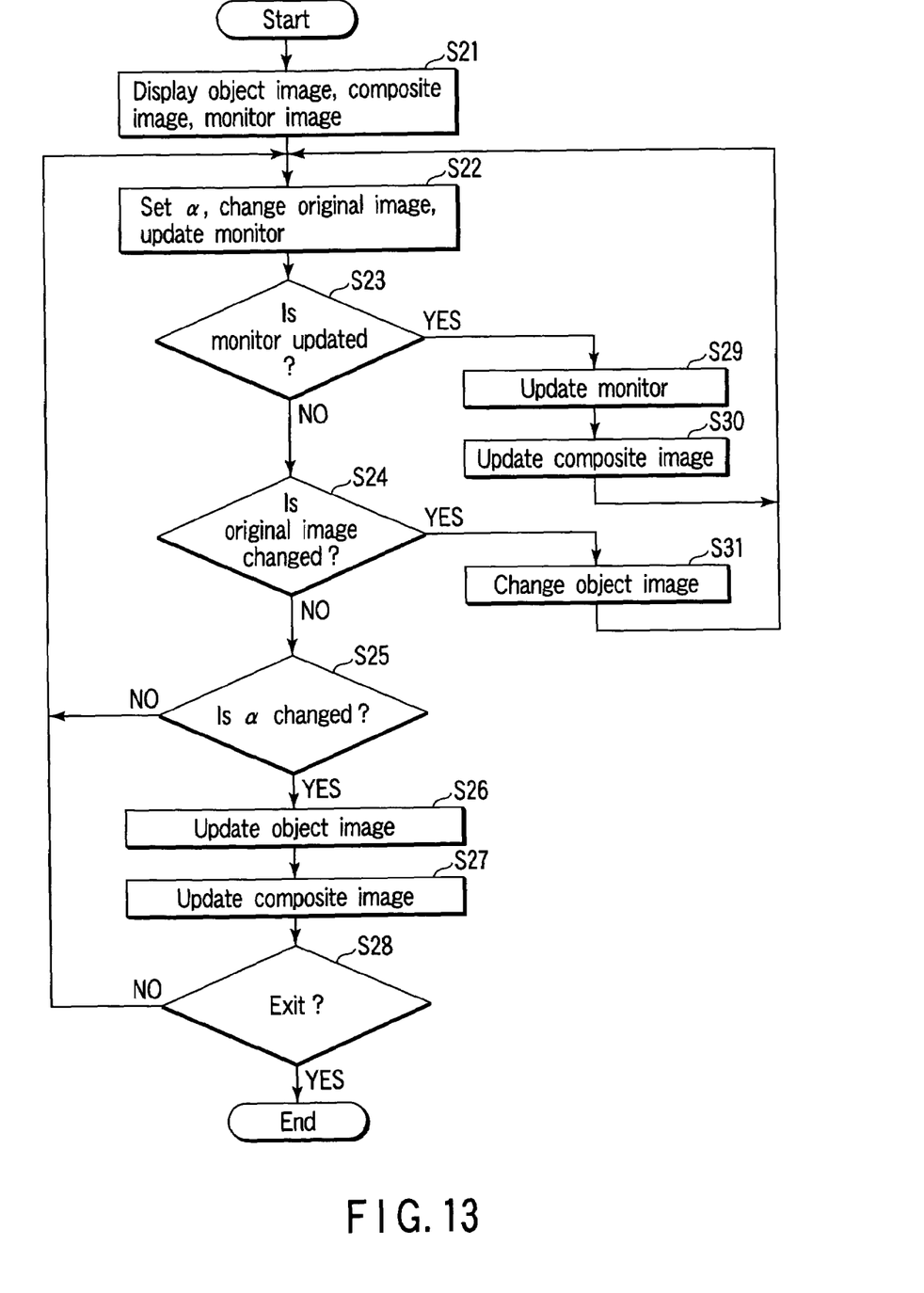
FIG. 13 shows a flow chart of a process for editing an object region by an a plurality of workers.

The process in the embodiment of FIG. 11 will be described referring to a flow chart of FIG. 13.

At first, the original image and alpha mask are read from the server 401, the object image and composite image are displayed and the object image in another client is displayed as a monitor image (S21). The alpha mask is set according to the input of the mouse pointer. The user changes the original image in order to set the object region. The monitor information is updated (S22). The monitor information represents information indicating which original image is edited or modification situation of the alpha mask.

It is determined whether monitoring is updated after step S22 (S23). In this determination, when the original image of an object to be edited is changed in another client, or when the alpha mask is modified, the process for updating the monitoring image is advanced to step S29. Otherwise, the process is advanced to step S24.

Whether the change of the original image is requested is determined in step S24. If the determination is YES, the process advances to step S31. The determination is NO, the process advances to step S25. In step S25, whether the alpha mask is changed is determined. When the determination is NO, the process returns to step S22. When the determination is YES, the process advances to step S26. In step S26, the object image is updated according to the alpha mask changed and the process advances to step 27. In this step 27, the composite image is updated according to the changed alpha mask. Thereafter, it is determined whether the user requests to end setting of the object region and displaying of the composite image displaying. When the determination is NO, the process returns to step S22. When the determination is YES, the process is ended.

In step S29, the monitoring image is updated based on the monitoring information, and the process advances to step S30. When the alpha mask is modified in another client, the composite image is updated according to the modification. In step S31, the object image is changed to the image that the user requires, and the process returns to step S22.

Figure 14:
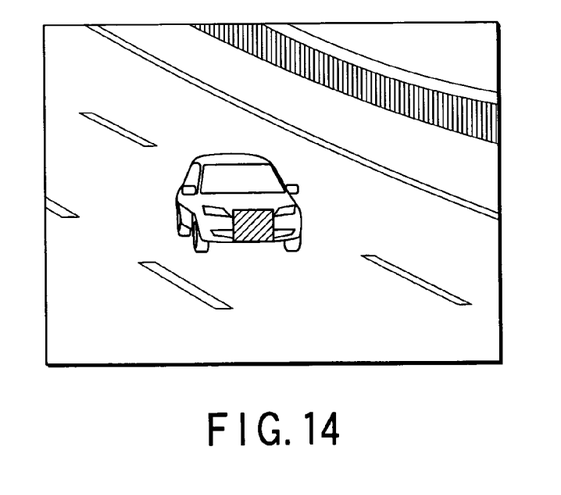
FIG. 14 shows an example which a part of a screen is painted over in black.

The embodiment for clipping an image is described hereinbefore. There is such case as to add, to some regions of an image, an image effect such as modification of color of the image, shade a license plate of a car with a black or blur it as shown in FIG. 14. To do so, a function that a brightness value or a color of an original image can be modified or a function that a modified result can be saved in an original image file is convenient. When the image effect should be added to a partial region of an image, there is a method to use the second alpha mask for specifying the region. The alpha mask described above expresses an object region that is clipped and combined with another object region. The second alpha mask is decided to be used for a process for blurring only a region whose pixel value is "1", for example. If the second alpha mask is used, the data of the original image is not changed. Thus, the image effect can be changed to ON or OFF as necessary. Similarly to the above embodiments, a region to which an image effect is to be added is colored with semi transparency to facilitate a distinction of the region, and the second alpha mask is edited while watching the object image window. The image to which the image effect is really applied is displayed on the composite image window.

As described above, according to the invention, since the composite image region can be always confirmed, it is not necessary to set a correct object region than need, resulting in decreasing a working time.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image editing method comprising:
   storing a plurality of original images;
   storing a plurality of alpha masks corresponding, respectively, to object images extracted from the plurality of original images, respectively;
   superposing in turn the object images that are extracted from the plurality of original images by the plurality of alpha masks, to display a composite image on a first display region of a display screen;
   modifying selectively the alpha masks on at least one second display region of the display screen to modify the composite image, when superposing in turn the object images, which alpha masks are selectively displayed on the second display region simultaneously with the composite image being displayed on the first display region; and
   displaying the composite image reflecting modification of at least one of the alpha masks on the first display region.

2. The image editing method according to claim 1, wherein the plurality of original images include still pictures.

3. The image editing method according to claim 1, wherein the plurality of original images include frame pictures of a video image.

4. The image editing method according to claim 3, wherein the composite image includes a moving image, and
a N-th frame of the moving image shows a composite image of object images included in a first frame of the original image to the N-th frame.

5. The image editing method according to claim 3, wherein the composite image includes an image obtained by combining object images included in a first frame to a M-th frame, and
the displaying includes displaying at least two composite images.

6. The image editing method according to claim 1, wherein the displaying includes setting a specific object image to which display processing different from other processing is subjected, and
the superposing includes switching the specific object image according to the original image whose object region is to be set.

7. The image editing method according to claim 1, wherein the modifying includes modifying the alpha mask by moving a pointer on the display screen and changing the composite image when the pointer is stopped.

8. The image editing method according to claim 1, which includes determining, as an original image to be processed, one of an original image including a point to be processed in the alpha mask and an original image that a point to be processed is near the alpha mask when a point of the composite image is specified, as a point to be processed, by a pointer on the display screen.

9. The image editing method according to claim 1, wherein the modifying includes
displaying the plurality of alpha masks on a plurality of second display regions, respectively, and
modifying the alpha masks on the second display regions.

10. The image editing method according to claim 1, wherein the original image includes a moving image comprising of a plurality of frames, and
which include arranging a tool used for changing the frames near the alpha mask displayed.

11. The image editing method according to claim 1, wherein the composite image includes
a moving image comprising of a plurality of frames, and
which includes arranging a tool used for changing the frames near the first display region displaying the composite image.

12. The image editing method according to claim 1, wherein the modifying includes
displaying thumbnail images generated by reducing the original images on a third display region of the screen, and
displaying a thumbnail image corresponding to the alpha mask being modified with being distinguished from the other.

13. The image editing method according to claim 1,
wherein the modifying includes
 displaying thumbnail images generated by reducing the original images on a third display region of the screen, and
 determining to modify the alpha mask corresponding to the original image corresponding to the thumbnail image
 when the thumbnail image is clicked or
 when the thumbnail image is dragged to the second display region displaying the alpha mask.

14. The image editing method according to claim 1,
wherein the modifying includes
 displaying first thumbnail images generated by reducing the plurality of original images on a third display region of the display screen,
 displaying second thumbnail images of original images used for the composite image on a fourth display region of the display screen, and
 clicking one of the second thumbnails on the fourth display region or dragging the second thumbnail image to the third display region.

15. The image editing method according to claim 1,
which includes generating alpha mask data having different pixel values between an object region of the alpha mask and a region aside from the object region, and
wherein the modifying includes modifying the composite image when the alpha mask data is changed.

16. The image editing method according to claim 1,
wherein the superposing includes combining a current frame and a past frame corresponding to the alpha masks.

17. An image editing apparatus comprising:
 a memory unit configured to stores a plurality of original images;
 a generator which generates a plurality of alpha masks corresponding, respectively, to object images extracted from the plurality of original images, respectively;
 a superposing unit configured to superpose in turn the object images that are extracted from the plurality of original images by the plurality of alpha masks, to display a composite image on a first display region of a display screen;
 a modifying unit configured to modify selectively the alpha masks on a second display region of the display screen to modify the composite image, when superposing in turn the object images, which alpha masks are selectively displayed on the second display region simultaneously with the composite image being displayed on the first display region; and
 a display unit configured to display the composite image reflecting modification of at least one of the alpha masks on the second display region.

18. A computer system for video editing, comprising:
 means for storing a plurality of original images;
 means for generating a plurality of alpha masks corresponding, respectively, to object images extracted from the plurality of original images, respectively;
 means for superposing in turn the object images that are extracted from the plurality of original images by the plurality of alpha masks, to display a composite image on a first display region of a display screen;
 means for modifying selectively the alpha masks on a second display region of the display screen to modify the composite image, when superposing in turn the object images, which alpha masks are selectively displayed on the second display region simultaneously with the composite image being displayed on the first display region; and
 means for displaying the composite image reflecting modification of at least one of the alpha masks on the second display region.

19. A video edition program stored in a computer readable medium, comprising:
 means for instructing a computer to store a plurality of original images;
 means for instructing the computer to generate a plurality of alpha masks corresponding, respectively, to object images extracted from the plurality of original images, respectively;
 means for instructing the computer to superpose in turn the object images that are extracted from the plurality of original images by the plurality of alpha masks, to display a composite image on a first display region of a display screen;
 means for instructing the computer to modify selectively the alpha masks on a second display region of the display screen to modify the composite image, when superposing in turn the object images, which alpha masks are selectively displayed on the second display region simultaneously with the composite image being displayed on the first display region; and
 means for instructing the computer to display the composite image reflecting modification of at least one of the alpha masks on the second display region.

* * * * *